June 19, 1923.
W. E. QUIMBY
1,459,034
GUARD FOR LAWN MOWERS
Filed Dec. 19, 1921.
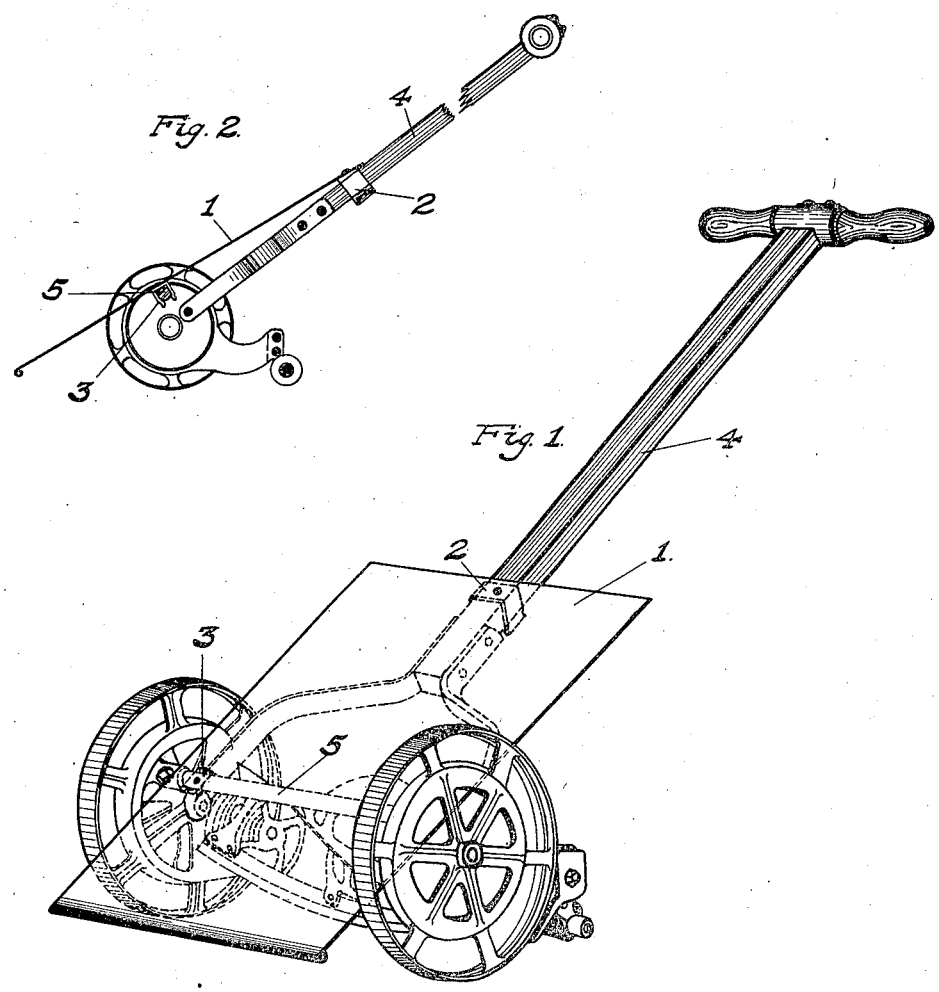
WILLIAM E. QUIMBY
INVENTOR
BY W. B. Whitney
ATTORNEY Patented June 19, 1923.

1,459,034

UNITED STATES PATENT OFFICE.

WILLIAM E. QUIMBY, OF ORANGE, NEW JERSEY.

GUARD FOR LAWN MOWERS.

Application filed December 19, 1921. Serial No. 523,351.

*To all whom it may concern:*

Be it known that I, WILLIAM E. QUIMBY, a citizen of the United States, residing at Orange, in the county of Essex and State of New Jersey, have invented a new and useful Guard for Lawn Mowers, of which the following is a specification.

My invention relates to lawn mowers, and the object thereof is to provide a guard which may be readily attached to and detached from a lawn mower of standard make and which when mounted in position thereon will enable the machine to be used around and under plants and low overhanging shrubs without injuring them.

The guard consists, essentially, of a thin stiff plate or apron and of means for detachably securing it to suitable parts of the frame of the machine in an inclined position extending from above downwardly and forwardly over the revolving cutter bars and in front thereof nearly to the ground.

Referring to the accompanying drawings, in which Figure 1 is a perspective view of a lawn mower equipped with my improved guard and Fig. 2 is a side view of the same, on a reduced scale, with parts of the machine removed or shown in section, the guard plate 1, a flat plate of a width to cover the entire length of the cutter bars, is shown as having riveted to its under side a spring clip 2, pressed down over and engaging the handle 4 of the machine, and two other spring clips 3 3, similarly pressed down over and engaging at its opposite ends the frame rod 5, by means of which the guard is secured in position at the incline desired.

The guard plate is made, in different sizes to fit the different widths of standard lawn mowers, of sheet metal, leather board, or other suitable material. The spring clips are of a size and shape and are so positioned on the back of the plate as to adapt the guard to the particular make of machine with which it is to be used, and, when the guard is of a material appropriate therefor, may be stamped out therefrom and shaped up as an integral part of the plate. It is also obvious that, in place of clips, other equivalent means may be used for securing the guard plate, in proper position, to any suitable parts of the machine.

The guard has been found to be extremely practical and efficient, since the inclined plate serves to raise without damage the low overhanging leaves of plants and branches of shrubs and to keep them entirely away from the cutter bars.

What I claim as new, and desire to secure by Letters Patent, is—

1. A guard for lawn mowers, comprising a substantially flat plate, of a width to cover the cutter bars, which is provided with means for detachably mounting it on the machine in position to cover the cutter bars and when the machine is in operative position to extend at a downward and forward inclination in front of the cutter bars and into proximity with the ground.

2. A guard for lawn mowers, comprising a sheet metal plate of a width substantially equal to the length of the cutter bars which is detachably secured to the machine over the cutter bars and when the machine is in operative position extends at a forward and downward inclination in front of the cutter bars and wheels and into proximity with the ground.

WILLIAM E. QUIMBY.